(12) United States Patent
Wahbo

(10) Patent No.: US 11,943,235 B2
(45) Date of Patent: Mar. 26, 2024

(54) DETECTING SUSPICIOUS USER LOGINS IN PRIVATE NETWORKS USING MACHINE LEARNING

(71) Applicant: Saudi Arabian Oil Company, Dhahran (SA)

(72) Inventor: Faisal Talal Wahbo, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 470 days.

(21) Appl. No.: 17/140,228

(22) Filed: Jan. 4, 2021

(65) Prior Publication Data

US 2022/0217156 A1 Jul. 7, 2022

(51) Int. Cl.
H04L 9/40 (2022.01)
G06N 5/04 (2023.01)
G06N 20/00 (2019.01)

(52) U.S. Cl.
CPC .......... *H04L 63/1408* (2013.01); *G06N 5/04* (2013.01); *G06N 20/00* (2019.01)

(58) Field of Classification Search
CPC .................................................. H04L 63/1408
See application file for complete search history.

(56) References Cited

U.S. PATENT DOCUMENTS

| | | | |
|---|---|---|---|
| 8,272,033 B2 | 9/2012 | Wasmud | |
| 8,280,844 B2 | 10/2012 | Warn et al. | |
| 9,210,183 B2 | 12/2015 | Sadovsky et al. | |
| 9,231,962 B1 | 1/2016 | Yen et al. | |
| 2016/0350165 A1 | 12/2016 | LeMond et al. | |
| 2018/0288063 A1 | 10/2018 | Kootayi et al. | |
| 2019/0068627 A1 | 2/2019 | Thampy | |
| 2020/0021607 A1 | 1/2020 | Muddu et al. | |
| 2020/0296124 A1 | 9/2020 | Pratt et al. | |
| 2021/0157312 A1* | 5/2021 | Cella | G06N 3/084 |
| 2021/0342836 A1* | 11/2021 | Cella | H04L 9/3239 |

OTHER PUBLICATIONS

PCT International Search Report and Written Opinion in International Appln. No. PCT/US2022/011174, dated Apr. 12, 2022, 14 pages.

Powell, "Detecting malicious logins as graph anomalies," Johns Hopkins University Applied Physics Laboratory, Mar. 2020, 37 pages.

* cited by examiner

*Primary Examiner* — Simon P Kanaan (74) *Attorney, Agent, or Firm* — Fish & Richardson P.C.

(57) ABSTRACT

Systems and methods include a computer-implemented method for detecting anomalous user logins. User login data for users is filtered, including monitoring workstations and servers accessed by users to obtain the user login data for the users. User login records are created for a current time period based, at least in part, on the user login data. An anomaly score is determined for each user, where the anomaly score indicates a deviation by the user from historical login patterns of the user. A user machine learning (ML) model is updated based on the predicting. User period login records are maintained over time using processed user login data. The user ML model is trained using the user periodic login records. Enriched login statistics are generated using the user ML model and the user periodic login records. A report that includes the enriched login statistics is generated in a graphical user interface.

20 Claims, 9 Drawing Sheets

DETECTING SUSPICIOUS USER LOGINS IN PRIVATE NETWORKS USING MACHINE LEARNING

BACKGROUND

The present disclosure applies to information technology (IT) cybersecurity monitoring.

Compromised user accounts are often used for lateral movement through a network to search for and access targeted key data and assets. In addition, insiders already in the network can misuse their user account to perform illegitimate activities. Traditional security controls mainly rely on static signatures that have a low probability of detecting such cybersecurity attacks. Moreover, the traditional security controls can generate a high number of false positive alerts.

SUMMARY

The present disclosure describes techniques that can be used for detecting suspicious user logins in private networks. The techniques can include the use of machine learning. In some implementations, a computer-implemented method includes the following. User login data for users is filtered, including monitoring workstations and servers accessed by users to obtain the user login data for the users. User login records are created for a current time period based, at least in part, on the user login data. An anomaly score is determined for each user, where the anomaly score indicates a deviation by the user from historical login patterns of the user. A user machine learning (ML) model is updated based on the predicting. User period login records are maintained over time using processed user login data. The user ML model is trained using the user periodic login records. Enriched login statistics are generated using the user ML model and the user periodic login records. A report that includes the enriched login statistics is generated in a graphical user interface.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. The techniques of the present disclosure can be used to address problems in information technology (IT) cybersecurity monitoring. The monitoring can include, for example, techniques for determining login novelty, including determining if a user has previously logged in to a particular device. Login novelty techniques can also use thresholds to identify if a user is performing a high number of logins. Login novelty techniques can also be used to maintain a profile for the user and detect when the user logs in to a system that has not been logged into before. Setting thresholds can be difficult since different users may have different login patterns depending on their role(s). Other techniques can rely on maintaining a profile for the user and can detect when the user logs in to a novel system. User login profiles can be graphed to detect inconsistencies. Most of these techniques have limitations or other problems such as not performing well in huge heterogeneous networks with a high number of users to need to be monitored. Some of the techniques do not work well if the user has low activity levels. In addition, many techniques require significant computational and storage resources. Moreover, many conventional techniques may suffer from high false positives rates.

Many challenges exist regarding analyzing user login activities. One challenge is that logs (of user login activity, for example) can be large and interpreted in different ways. For example, logins can be performed by the user or can be automated and performed by other systems without user interaction. Conventional techniques may require high maintenance and may not be able to be efficiently automated. In addition, an added challenge is that environments are dynamic and new users are being introduced all the time. Furthermore, users' logins and other behaviors can change over time as each user's job and activities change.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for information technology (IT) cybersecurity monitoring, specifically detecting suspicious user logins in private networks, for example, using machine learning (ML). Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

A system for detecting suspicious login utilizing machine learning can be dynamic and can be automated to continuously analyze accounts for existing and new users. The system can adapt to changes in the environment by a systematic retraining approach. In addition, the system can consider many features of the account login to be able to correctly identify any suspicious behavior using machine learning with low false positive alerts.

In some implementation, systems can include the use of unsupervised machine learning (deep learning) with uniquely extracted and engineered login features to detect suspicious logins. False positives alerts that are common in conventional systems often result from a user login to a novel system. Reducing false positives alerts can be handled through different techniques. For example, if a user login to a novel system shares similar naming patterns to systems logged into before by the user, these logins can be identified as normal. Another aspect that improves (reduces) false positive rates includes techniques that are not susceptible to noise. For example, a login that follows a same historical pattern with small changes, such as a small change in login rates, will not result in the reporting (for example, by a model) the login as an anomaly. In addition, techniques of the present disclosure can be completely automated and automatically adjust to changes in the network/user accounts, which can result in reduced numbers of false positives and false negatives. Moreover, techniques of the present disclosure can be implemented in large networks that support large numbers of users. In addition, the techniques of the present disclosure require low maintenance and resources compared to other approaches.

The present disclosure describes a system (and methods) for detecting suspicious user login behavior in private networks. In some implementations, the system can be composed of several modules. A collection and filtering module can be used to collect event logs from monitored systems (for example, including workstations and servers) on a periodic basis (such as every 24 hours). The logs for each period can be filtered to include only user account successful logins. A data processing module can be used to group and process the logs for each user so that for each user. For example, a summary record can be created for a particular period. The summary record can include the total number of successful logins, the number of destination systems accessed, the number of systems accessed from (source), the list of systems accessed, the list of systems accessed from, and the number of times different authentication protocols were utilized. Different authentication protocols that are tracked include, but are not limited to, New Technology (NT) large area network (LAN) Manager (NTLM) and Kerberos. A conversion module can be used to add additional numerical data to the record by converting the systems list to a list of integers based on a count of characters in each system name and a number of times that the system has been accessed or accessed from. A training module can use an anomaly detection machine learning algorithm, such as deep learning auto encoders, to train a model for each user account using the summarized user records collected from previous periods over sometime as training samples. Whenever a new period has passed (for example, every 24 hours), the logs for that period can be processed for each user and evaluated by an evaluation module using the user trained ML model to produce a deviation score. A reporting module can be used to report users for which the deviation score is higher than a threshold. Reports can be provided, for example, to security operation analysts for further investigation. The reporting module can also enrich the reported alerts with information from the user's previous records and perform correlation between reported records to prioritize alerts.

Figure 1:
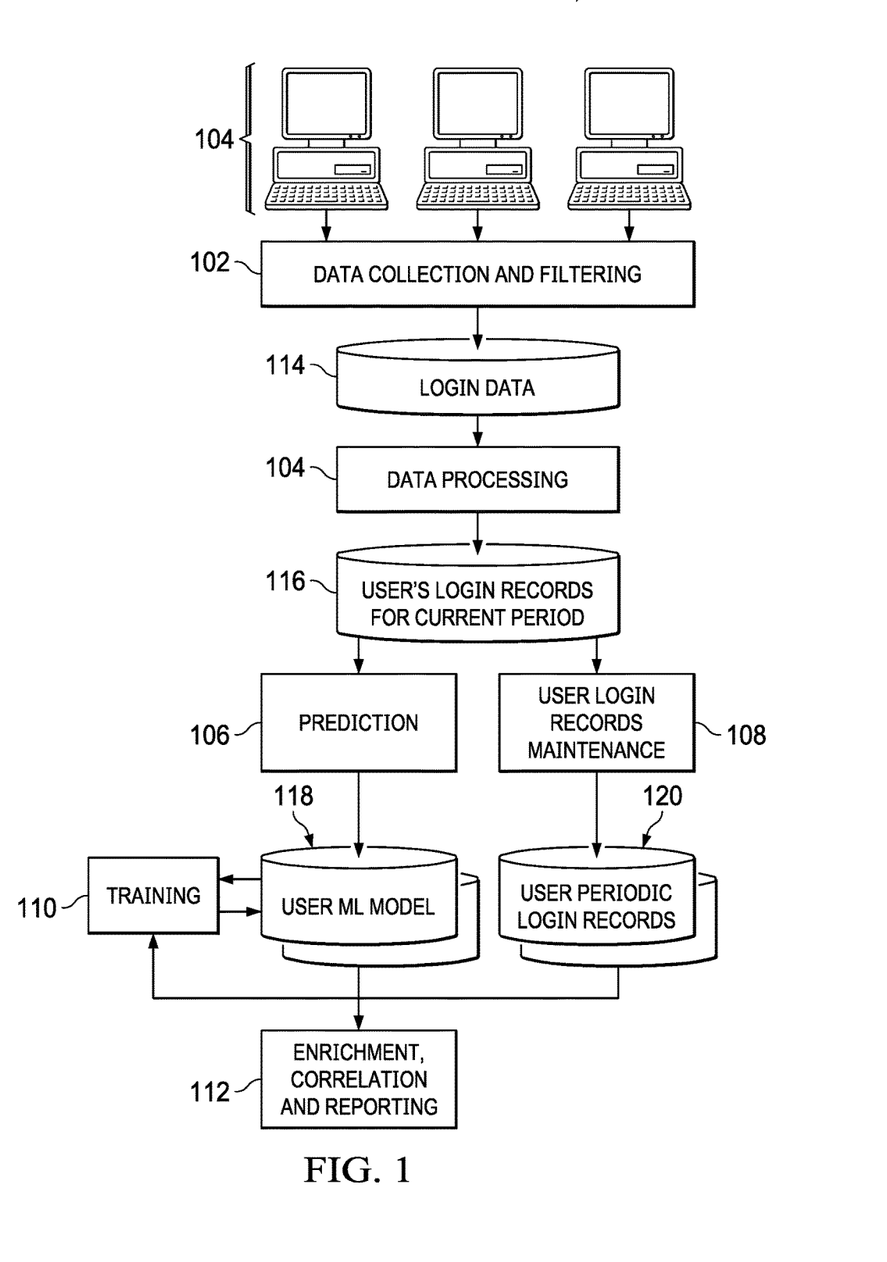
FIG. 1 is a flow diagram of an example of a workflow for detecting suspicious user logins in private networks, according to some implementations of the present disclosure.

FIG. 1 is a flow diagram of an example of a workflow 100 for detecting suspicious user logins in private networks, according to some implementations of the present disclosure. In some implementations, the workflow 100 includes the steps of data collection and filtering 102, data processing 104, prediction 106, user login records maintenance 108, training 110, and enrichment, correlation, and reporting 112. Data collection and filtering 102 produces login data 114 which is used by data processing 104. Data processing 104 produces a user's login records for a current period 116, which is used by prediction 106 and user login records maintenance 108. Prediction 106 creates a user machine learning (ML) model 118. User login records maintenance 108 creates user periodic login records 120. Training 110 occurs on the ML model 118 using the user periodic login records 120. The ultimate output of the workflow 100 is the enrichment, correlation, and reporting 112.

Figure 2:
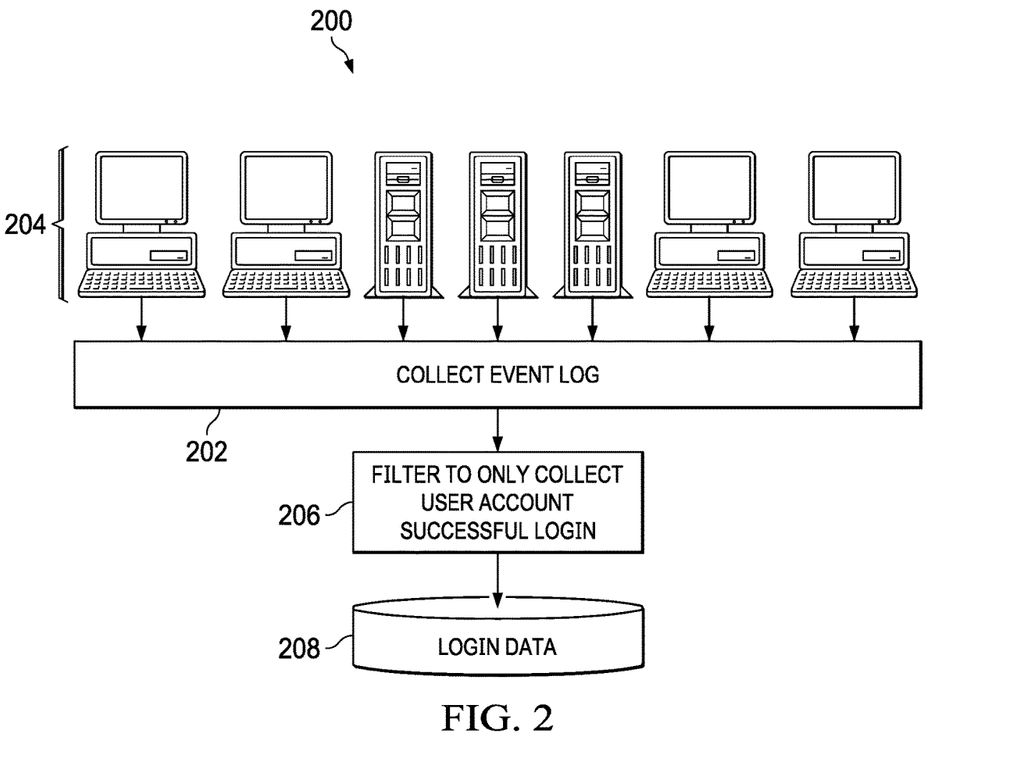
FIG. 2 is a flow diagram of an example of a workflow for data collection and filtering, according to some implementations of the present disclosure.

FIG. 2 is a flow diagram of an example of a workflow 200 for data collection and filtering 102, according to some implementations of the present disclosure. In a first step, collect event log 202, data is collected from sources 204 (for example, monitored workstations and servers). The data is filtered (206) to collect only successful user account login attempts and to remove local user account successful login. The filtered data is stored in login data 208, for example, that can serve as a centralized repository.

Figure 3:
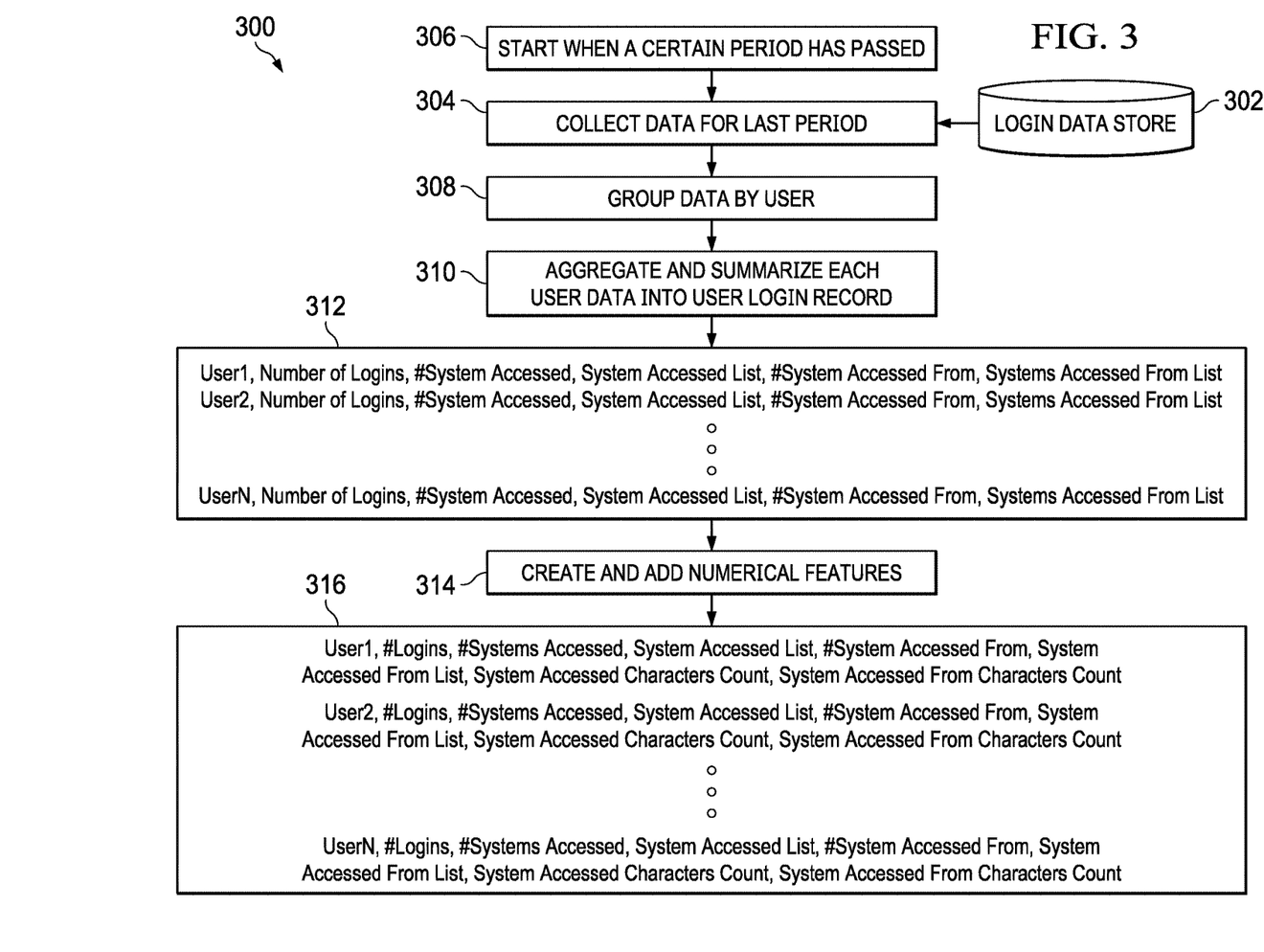
FIG. 3 is a flow diagram of an example of a workflow for data processing, according to some implementations of the present disclosure.

FIG. 3 is a flow diagram of an example of a workflow 300 for data processing 104, according to some implementations of the present disclosure. Data from a login data store 302 is collected (304) and processed whenever a certain configurable period has passed (306) (for example, every 24 hours). The collected data in the last period is grouped (308) by user account. The login data for each user is aggregated and summarized (310) such as each user record 312 for the following: 1) the number of logins performed; 2) the number of systems accessed; 3) the number of systems used to access from if available (can be ignored if not available); 4) the list of unique accessed systems with login frequency for each system; 5) a list of unique accessed from systems with login from frequency (which can be optional); and 6) a count of each authentication protocol used (if there are different login protocols in the environment).

User records 312 can be created even if some data is not available, such as the system accessed from (login source). After that, the list of systems accessed and access frequencies for each system are used to create (314) additional numerical features (316). This can be done using the following algorithm. First, the characters used in hostnames in the network are determined. Second, for each of the characters, two variables (columns) are created: one for accessed-to system (destination) and one for accessed-from systems (source). Third, the number of times each character appears in the host name is counted and is multiplied by the number of times that the system was accessed. This can be done for each system that was logged in to, and values for each character can be summed. Fourth, the same counting and multiplying is performed for the accessed-from (source) systems.

Figure 4:
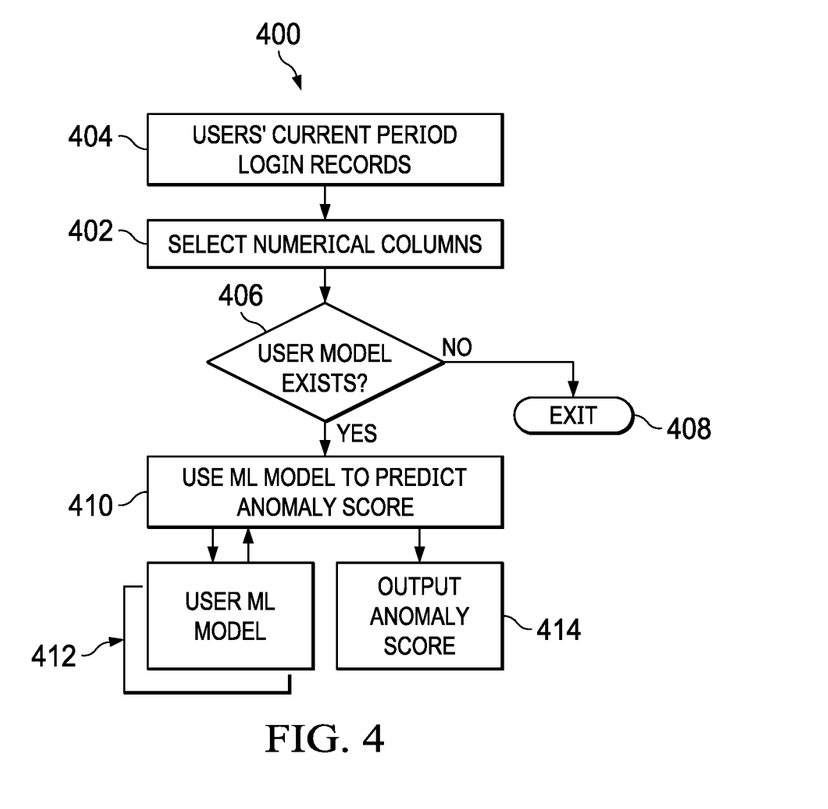
FIG. 4 is a flow diagram of an example of a workflow for prediction, according to some implementations of the present disclosure.

FIG. 4 is a flow diagram of an example of a workflow 400 for prediction 106, according to some implementations of the present disclosure. Numerical features are selected 402 from each user's current period login records 404 for a current period. If an ML model already exists 406 for the user account, the selected feature vector is evaluated using user ML model 412, and an anomaly score is predicted (410), and an anomaly score is output (414). The ML algorithm used can be a deep learning auto encoder, for example. If no model exists at 406, then exit can occur at 408. The anomaly score can be calculated by calculating the distance between the input and the output of the deep learning neural network.

Figure 5:
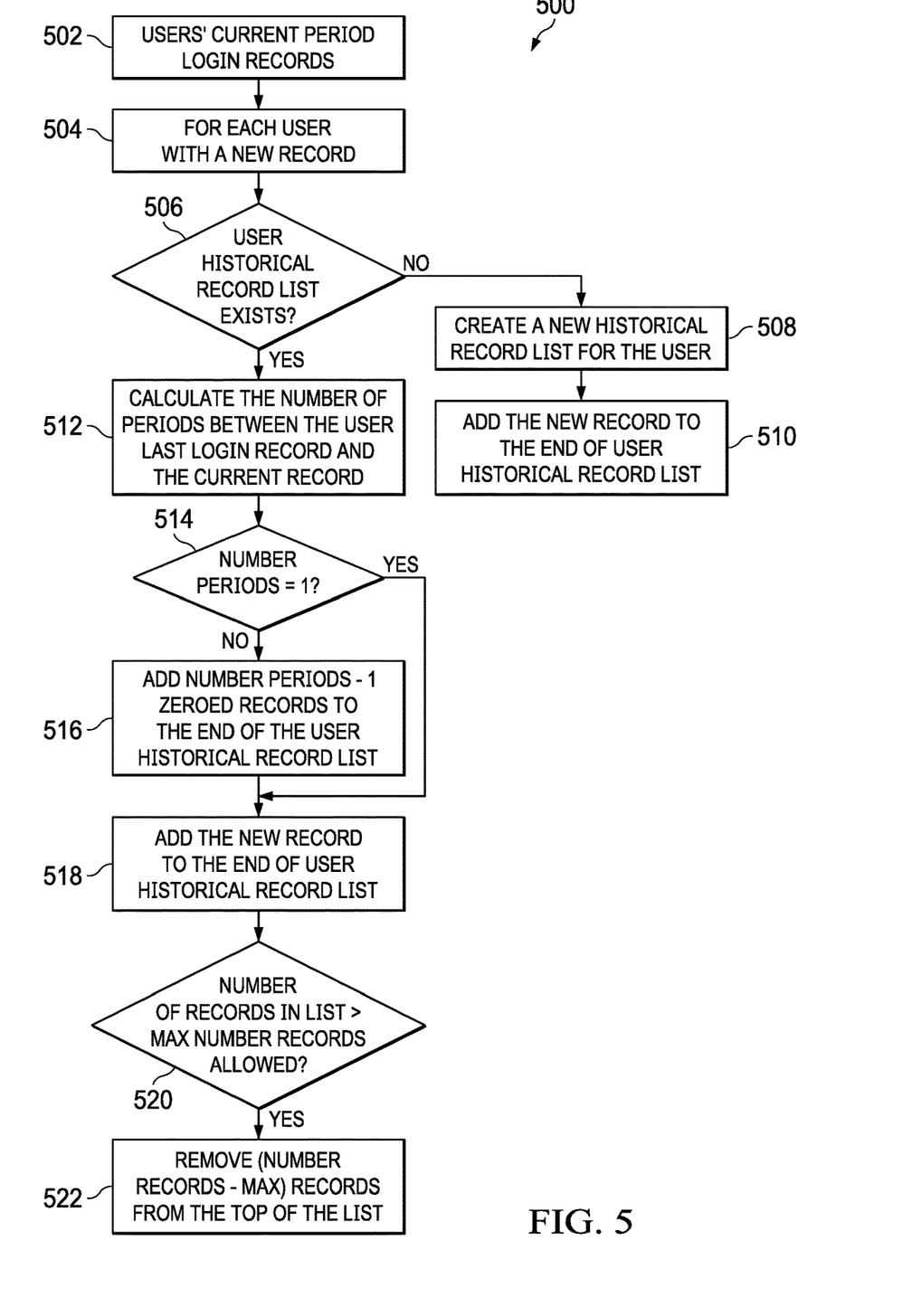
FIG. 5 is a flow diagram of an example of a workflow for user login records maintenance, according to some implementations of the present disclosure.

FIG. 5 is a flow diagram of an example of a workflow 500 for user login records maintenance 108, according to some implementations of the present disclosure. User historical login records are updated with a new user's login record for a current period (502). For each user with a new login record in the current period (504), the following algorithm can be followed to add the new record to the user historical login record if it exists. First, the date and time stamp are checked for the last record added (510) to the historical list. A new historical record list is created (508) if one does not already exist. A number of periods is calculated (512) between the user last login record and the current one. If the difference between the time of the new and last record is one period (514), then the new record is added (516) directly to the end of the list. If the time difference is x (not=1) periods, then x−1 records are added (518) with 0 number of loggings, in an empty login to and from list, with zeroes added in all remaining columns in the historical list. These empty records represent days in which the account has not performed any login activities. The new record for the current period is then added to the bottom of the user historical login list. Old records can be removed from the top if the number of records in the list exceeds a threshold after the addition is performed. In case the user account does not have historical login records, a new historical user login record is created, and the current period record is added. If the number of records in the list exceeds the maximum allowed (520), then a number of records are removed (522) from the list.

Figure 6:
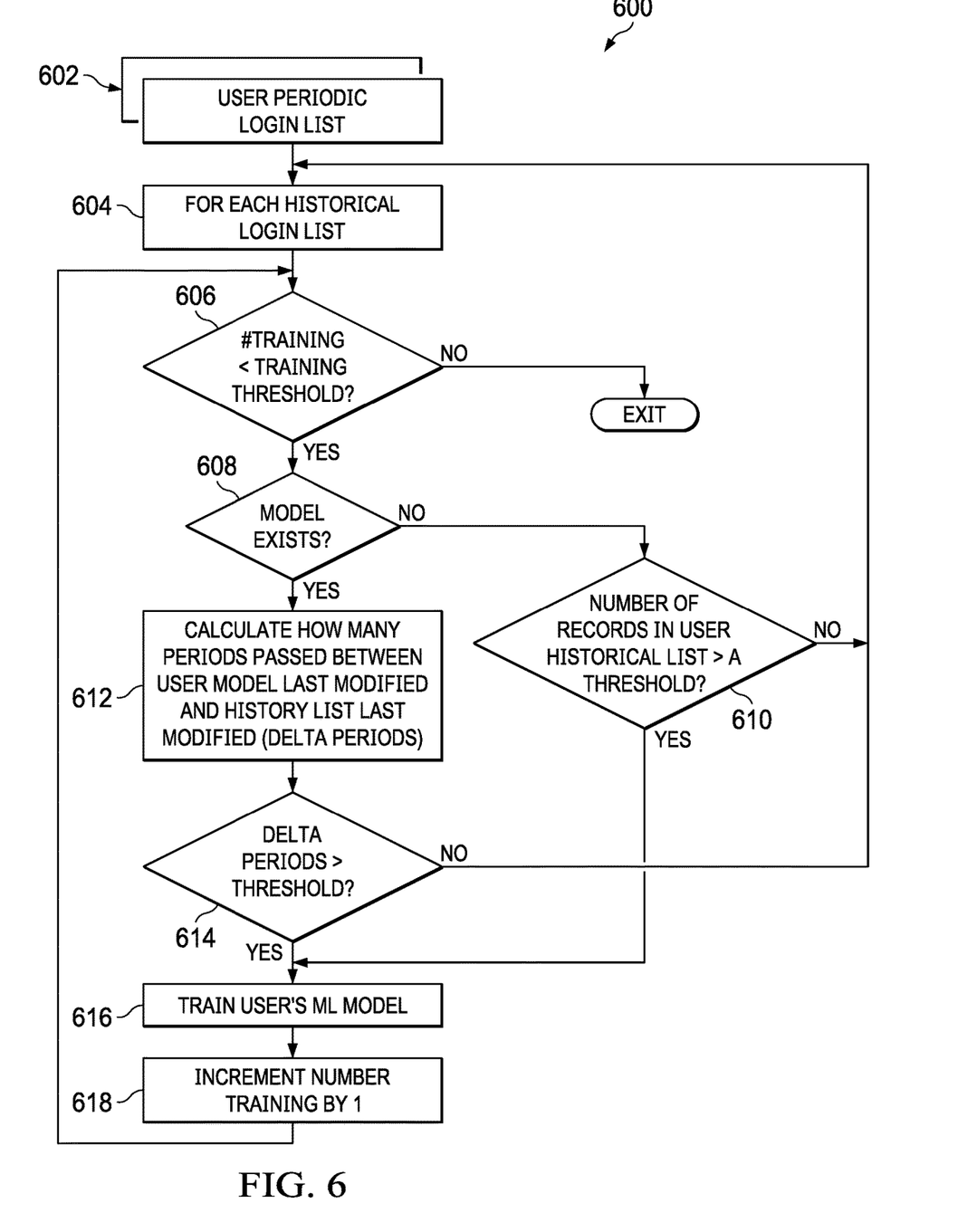
FIG. 6 is a flow diagram of an example of a workflow for training, according to some implementations of the present disclosure.

FIG. 6 is a flow diagram of an example of a workflow 600 for training 110, according to some implementations of the present disclosure. Models for new users and existing users can be trained for each available user account file history record. For example, using users' periodic login list 602, the following steps can be used for each historical login list 604. The process associated with the workflow 600 can continue as long as the number of trained models during the current period does not exceed (606) the maximum number allowed (for example, controlled using a configurable parameter). First, if a model for the user account exists (608), the model creation date is compared with the history file last update date to determine how many periods have passed between the user model last modified date and the history list last modified date (to determine delta period). If the difference is more than a set threshold (614) that specifies how old a model has to be before it is updated. The user history file can be used to train an auto encoder deep learning model. The number of trained model in this period is then incremented. Second, if the user history file belongs to a user that does not have a trained model, a check is made if there are enough records in the file. This is done by counting (612) the number of records in the user history list and comparing the number with a threshold (610). If the number of records in the file reaches (610) a threshold (minimum number of records required to train a model), then the feature vector is extracted and sent to an ML algorithm to generate a model and train (616) the user's ML model. The number of trained models is also incremented (618). Third, if the number of trained models in this period reaches the maximum number of training allowed in a period (at 606), then the training stops for the current period. This is done as a way to manage resources and to distribute retraining.

Figure 7:
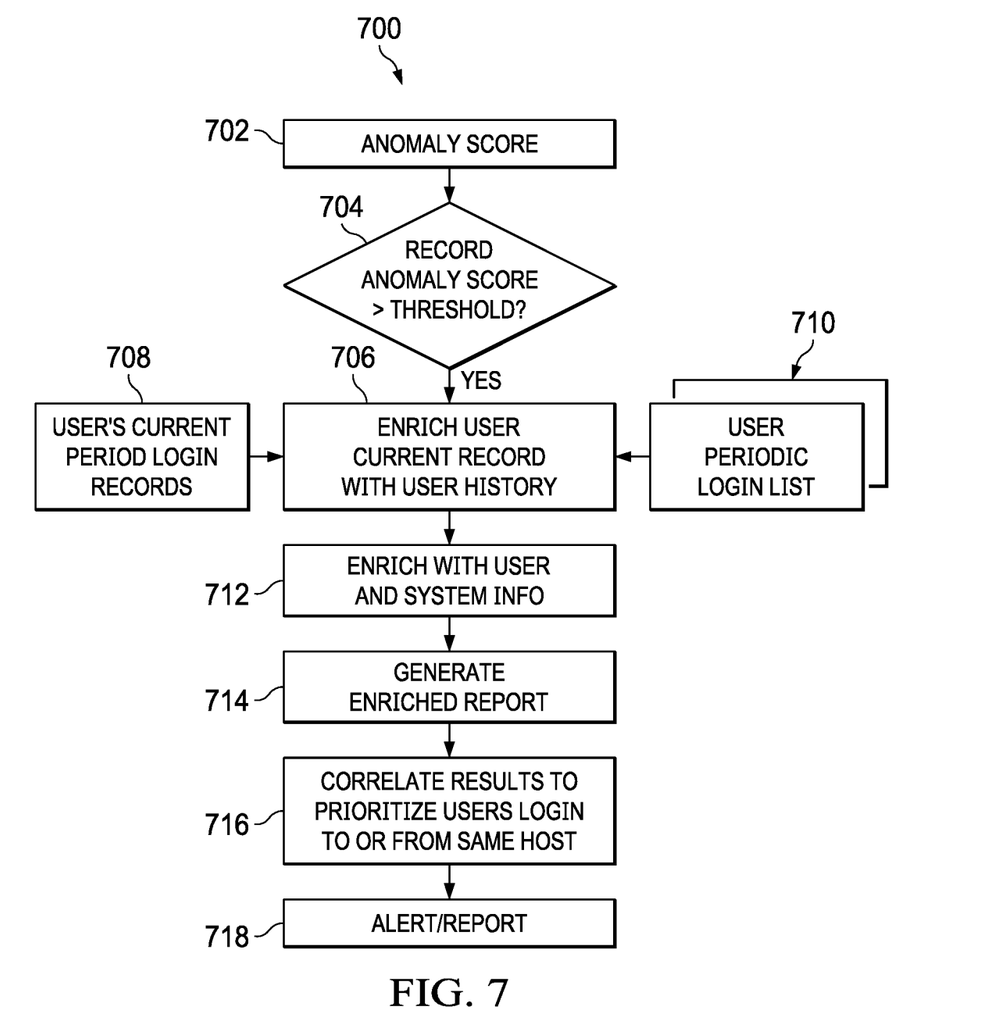
FIG. 7 is a flow diagram of an example of a workflow for enrichment, correlation, and reporting, according to some implementations of the present disclosure.

FIG. 7 is a flow diagram of an example of a workflow 700 for enrichment, correlation, and reporting 112, according to some implementations of the present disclosure. User login records that generate an anomaly score higher than a threshold are identified in the workflow 700. A user login record will already have information related to the login activities, such as the list of systems being accessed and the number of logins performed. This information can be enriched by using information in the user historical login records. This information can include, but is not limited to: 1) the average number of logins the user performs per day; 2) the average number of systems accessed per day; 3) the first date each system that has been accessed during the current period has been accessed before, or if it is a novel login; and 4) the number of periods during which the accessed systems has been accessed before.

An anomaly score 702 is read for the user, and a determination is made whether the recorded anomaly score exceeds a threshold. If so, the user's information is further processed in the workflow 700. The user's current record is enriched (706) with user history, using the user's current period login records 708 and the user periodic login list 710.

The user login records is also enriched (712) with external information such as user account information (for example, user role, recent role change, and creation dates) and systems information (for example, system function and system owner). Some of this enrichment information can be used to filter results, for example, by not including results for a user that has recently changed his/her role.

The enriched anomalous login records can be correlated between themselves or correlated with external events/alerts. Internal correlation can facilitate the determination that a single system or host is being logged to/from by multiple users. The correlation can create a relationship between anomalous logins, which can result in assigning a higher priority for the investigation of the logins. The results can finally be sent as a report or alert for security analysts to investigate or can be graphed in a user interface.

Figure 8:
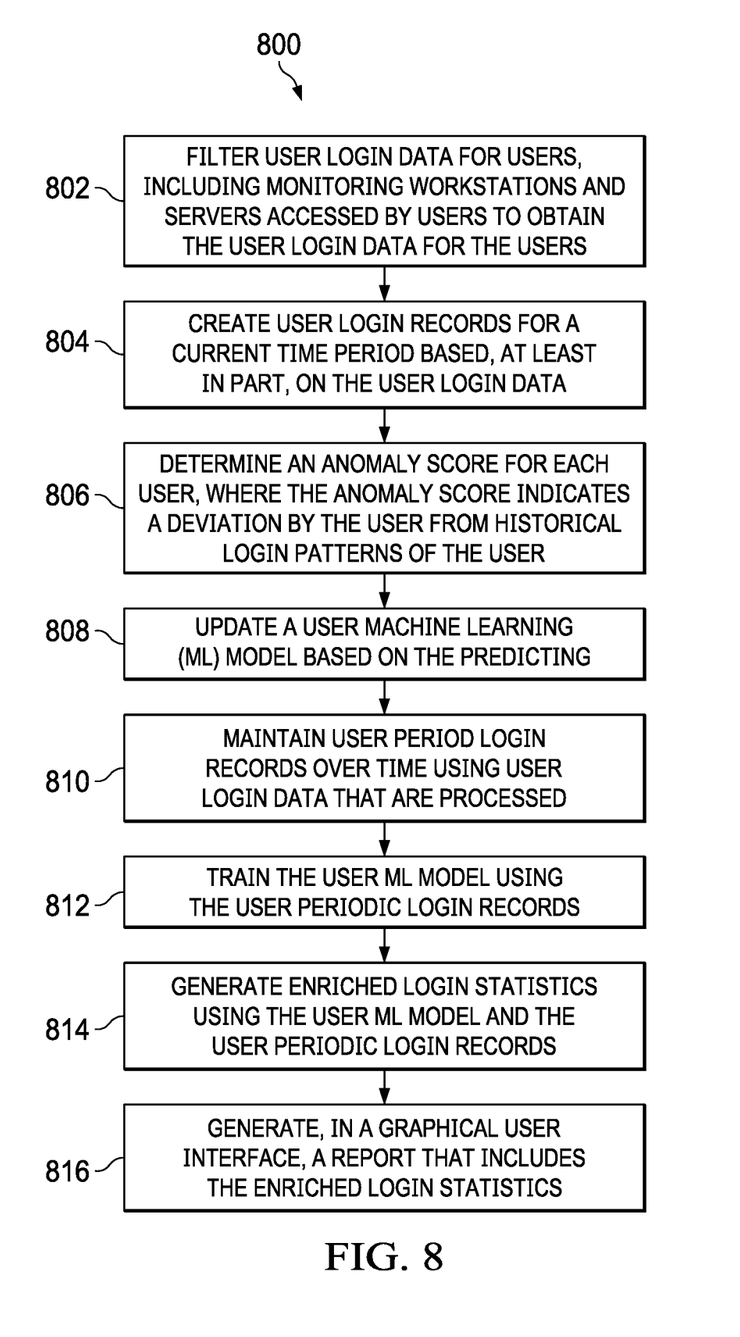
FIG. 8 is a flowchart of an example of a method for detecting and generating reports of suspicious user logins in private networks, according to some implementations of the present disclosure.

FIG. 8 is a flowchart of an example of a method 800 for detecting and generating reports of suspicious user logins in private networks, according to some implementations of the present disclosure. For clarity of presentation, the description that follows generally describes method 800 in the context of the other figures in this description. However, it will be understood that method 800 can be performed, for example, by any suitable system, environment, software, and hardware, or a combination of systems, environments, software, and hardware, as appropriate. In some implementations, various steps of method 800 can be run in parallel, in combination, in loops, or in any order. In some implementations, modules identified in steps 802-816 can be implemented as modules represented by components of FIG. 1.

At 802, user login data for users is filtered, including monitoring workstations and servers accessed by users to obtain the user login data for the users. For example, filtering the user login data for the users can include collecting and filtering an event log documenting successful login events for users. From 802, method 800 proceeds to 804.

At 804, user login records are created for a current time period based, at least in part, on the user login data. As an example, creating user login records for a current time period can include: determining that a configurable period of time has passed; and grouping the user login data for the configurable period of time, including determining, for each of the users, a number of logins performed, a number of systems accessed, a number of source systems used to access a system, a list of unique access-to systems with a login frequency for each access-to system, a list of unique access-from systems with a login frequency for each access-from system, and a count of each authentication protocol used. From 804, method 800 proceeds to 806.

At 806, an anomaly score is determined for each user, where the anomaly score indicates a deviation by the user from historical login patterns of the user. For example, determining the anomaly score for each user can include: extracting numerical features from each user's current period login records for the current time period; evaluating the numerical features using user ML model; and predicting, using the evaluating, the anomaly score for the user. From 806, method 800 proceeds to 808.

At 808, a user machine learning (ML) model is updated based on the predicting. The system can use a feedback loop from a security analyst to retrain a user machine learning model if a false positive alert is reported before the threshold (that specifies how old a model has to be before it is updated) is met. This is especially useful if the threshold is set to a high value for resource conservation. In addition, the system can trigger an automatic user ML model update if the user had a recent role change and started to generate many alerts. From 808, method 800 proceeds to 810.

At 810, user period login records are maintained over time using user login data that are processed. For example, maintaining the user period login records over time can include updating historical login records using login data for current time period and maintaining the historical login records within a threshold list size. From 810, method 800 proceeds to 812.

At 812, the user ML model is trained using the user periodic login records. As an example, training the user ML model using the user periodic login records can include summarizing user records collected from previous time periods used as training samples. From 812, method 800 proceeds to 814.

At 814, enriched login statistics are generated using the user ML model and the user periodic login records. For example, generating the enriched login statistics can include: generating an average number of logins the user performs per day using information in user historical login records; generating an average number of systems accessed per day; identifying a first date each system has been accessed; and identifying a number of periods during which the accessed systems have been accessed. From 814, method 800 proceeds to 816.

At 816, a report that includes the enriched login statistics is generated in a graphical user interface. The report can include the following for each reported user account. A deviation score can include a priority rating (for example, high, medium, or low). Role information can indicate, for example, "Does the user have a valid change request during the current period, user account information (for example, user role, recent role change, and creation dates)?" A login activity summary table can include, for example, a total number of logins the user has performed in a current alerted period, the average number of logins the user performs per previous periods, the number of accessed systems during current period, the average number of accessed system per previous periods, the number of source systems during the current period, and the average number of source systems per previous periods. An accessed systems information table can include the systems being accessed, the first time the system has been accessed, the number of periods the system has been accessed, the system function, and the system owner. A source systems information table can identify the systems being accessed from, the first time the system has been accessed from, the number of periods the system has been accessed from, the system function, and the system owner. Based on an alert that is generated, additional automatic actions can be taken besides sending a report, such as disabling the user account. For example, a user with a high deviation score (and with no valid change request, no recent role change, and no correlation between the user role and server role) can be automatically disabled. Automatic actions can be determined, for example, based on a rules set indicating which actions are to be performed in response to certain login conditions being met. After 816, method 800 can stop.

Figure 9:
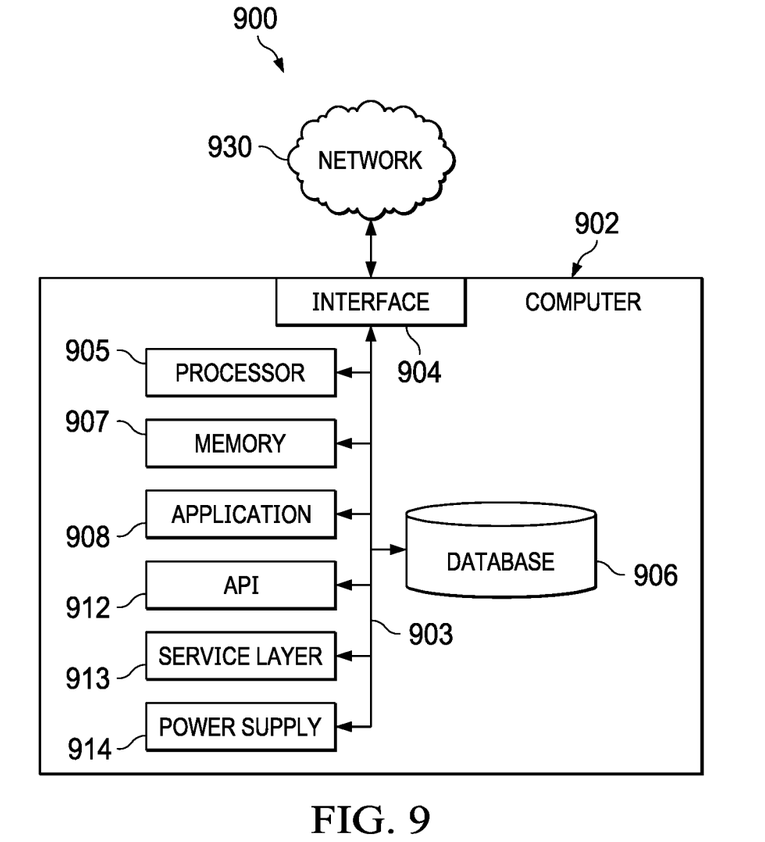
FIG. 9 is a block diagram illustrating an example computer system used to provide computational functionalities associated with described algorithms, methods, functions, processes, flows, and procedures as described in the present disclosure, according to some implementations of the present disclosure.

FIG. 9 is a block diagram of an example computer system 900 used to provide computational functionalities associated with described algorithms, methods, functions, processes, flows, and procedures described in the present disclosure, according to some implementations of the present disclosure. The illustrated computer 902 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 902 can include input devices such as keypads, keyboards, and touch screens that can accept user information. Also, the computer 902 can include output devices that can convey information associated with the operation of the computer 902. The information can include digital data, visual data, audio information, or a combination of information. The information can be presented in a graphical user interface (UI) (or GUI).

The computer 902 can serve in a role as a client, a network component, a server, a database, a persistency, or components of a computer system for performing the subject matter described in the present disclosure. The illustrated computer 902 is communicably coupled with a network 930. In some implementations, one or more components of the computer 902 can be configured to operate within different environments, including cloud-computing-based environments, local environments, global environments, and combinations of environments.

At a top level, the computer 902 is an electronic computing device operable to receive, transmit, process, store, and manage data and information associated with the described subject matter. According to some implementations, the computer 902 can also include, or be communicably coupled with, an application server, an email server, a web server, a caching server, a streaming data server, or a combination of servers.

The computer 902 can receive requests over network 930 from a client application (for example, executing on another computer 902). The computer 902 can respond to the received requests by processing the received requests using software applications. Requests can also be sent to the computer 902 from internal users (for example, from a command console), external (or third) parties, automated applications, entities, individuals, systems, and computers.

Each of the components of the computer 902 can communicate using a system bus 903. In some implementations, any or all of the components of the computer 902, including hardware or software components, can interface with each other or the interface 904 (or a combination of both) over the system bus 903. Interfaces can use an application programming interface (API) 912, a service layer 913, or a combination of the API 912 and service layer 913. The API 912 can include specifications for routines, data structures, and object classes. The API 912 can be either computer-language independent or dependent. The API 912 can refer to a complete interface, a single function, or a set of APIs.

The service layer 913 can provide software services to the computer 902 and other components (whether illustrated or not) that are communicably coupled to the computer 902. The functionality of the computer 902 can be accessible for all service consumers using this service layer. Software services, such as those provided by the service layer 913, can provide reusable, defined functionalities through a defined interface. For example, the interface can be software written in JAVA, C++, or a language providing data in extensible markup language (XML) format. While illustrated as an integrated component of the computer 902, in alternative implementations, the API 912 or the service layer 913 can be stand-alone components in relation to other components of the computer 902 and other components communicably coupled to the computer 902. Moreover, any or all parts of the API 912 or the service layer 913 can be implemented as child or sub-modules of another software module, enterprise application, or hardware module without departing from the scope of the present disclosure.

The computer 902 includes an interface 904. Although illustrated as a single interface 904 in FIG. 9, two or more interfaces 904 can be used according to particular needs, desires, or particular implementations of the computer 902 and the described functionality. The interface 904 can be used by the computer 902 for communicating with other systems that are connected to the network 930 (whether illustrated or not) in a distributed environment. Generally, the interface 904 can include, or be implemented using, logic encoded in software or hardware (or a combination of software and hardware) operable to communicate with the network 930. More specifically, the interface 904 can include software supporting one or more communication protocols associated with communications. As such, the network 930 or the interface's hardware can be operable to communicate physical signals within and outside of the illustrated computer 902.

The computer 902 includes a processor 905. Although illustrated as a single processor 905 in FIG. 9, two or more processors 905 can be used according to particular needs, desires, or particular implementations of the computer 902 and the described functionality. Generally, the processor 905 can execute instructions and can manipulate data to perform the operations of the computer 902, including operations using algorithms, methods, functions, processes, flows, and procedures as described in the present disclosure.

The computer 902 also includes a database 906 that can hold data for the computer 902 and other components connected to the network 930 (whether illustrated or not). For example, database 906 can be an in-memory, conventional, or a database storing data consistent with the present disclosure. In some implementations, database 906 can be a combination of two or more different database types (for example, hybrid in-memory and conventional databases) according to particular needs, desires, or particular implementations of the computer 902 and the described functionality. Although illustrated as a single database 906 in FIG. 9, two or more databases (of the same, different, or combination of types) can be used according to particular needs, desires, or particular implementations of the computer 902 and the described functionality. While database 906 is illustrated as an internal component of the computer 902, in alternative implementations, database 906 can be external to the computer 902.

The computer 902 also includes a memory 907 that can hold data for the computer 902 or a combination of components connected to the network 930 (whether illustrated or not). Memory 907 can store any data consistent with the present disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 (of the same, different, or combination of types) can be used according to particular needs, desires, or particular implementations of the computer 902 and the described functionality. While memory 907 is illustrated as an internal component of the computer 902, in alternative implementations, memory 907 can be external to the computer 902.

The application 908 can be an algorithmic software engine providing functionality according to particular needs, desires, or particular implementations of the computer 902 and the described functionality. For example, application 908 can serve as one or more components, modules, or applications. Further, although illustrated as a single application 908, the application 908 can be implemented as multiple applications 908 on the computer 902. In addition, although illustrated as internal to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion and management circuits, including recharging, standby, and power management functionalities. In some implementations, the power-supply 914 can include a power plug to allow the computer 902 to be plugged into a wall socket or a power source to, for example, power the computer 902 or recharge a rechargeable battery.

There can be any number of computers 902 associated with, or external to, a computer system containing computer 902, with each computer 902 communicating over network 930. Further, the terms "client," "user," and other appropriate terminology can be used interchangeably, as appropriate, without departing from the scope of the present disclosure. Moreover, the present disclosure contemplates that many users can use one computer 902 and one user can use multiple computers 902.

Described implementations of the subject matter can include one or more features, alone or in combination.

For example, in a first implementation, a computer-implemented method includes the following. User login data for users is filtered, including monitoring workstations and servers accessed by users to obtain the user login data for the users. User login records are created for a current time period based, at least in part, on the user login data. An anomaly score is determined for each user, where the anomaly score indicates a deviation by the user from historical login patterns of the user. A user machine learning (ML) model is updated based on the predicting. User period login records are maintained over time using processed user login data. The user ML model is trained using the user periodic login records. Enriched login statistics are generated using the user ML model and the user periodic login records. A report that includes the enriched login statistics is generated in a graphical user interface.

The foregoing and other described implementations can each, optionally, include one or more of the following features:

A first feature, combinable with any of the following features, where filtering the user login data for the users includes collecting and filtering an event log documenting successful login events for users.

A second feature, combinable with any of the previous or following features, where creating user login records for a current time period includes: determining that a configurable period of time has passed; and grouping the user login data for the configurable period of time, including determining, for each of the users, a number of logins performed, a number of systems accessed, a number of source systems used to access a system, a list of unique access-to systems with a login frequency for each access-to system, a list of unique access-from systems with a login frequency for each access-from system, and a count of each authentication protocol used.

A third feature, combinable with any of the previous or following features, where determining the anomaly score for each user includes: extracting numerical features from each user's current period login records for the current time period; evaluating the numerical features using user ML model; and predicting, using the evaluating, the anomaly score for the user.

A fourth feature, combinable with any of the previous or following features, where maintaining the user period login records over time includes: updating historical login records using login data for current time period; and maintaining the historical login records within a threshold list size.

A fifth feature, combinable with any of the previous or following features, where training the user ML model using the user periodic login records includes summarizing user records collected from previous time periods used as training samples.

A sixth feature, combinable with any of the previous or following features, where generating the enriched login statistics includes: generating an average number of logins the user performs per day using information in user historical login records; generating an average number of systems accessed per day; identifying a first date each system has been accessed; and identifying a number of periods during which the accessed systems have been accessed.

In a second implementation, a non-transitory, computer-readable medium stores one or more instructions executable by a computer system to perform operations including the following. User login data for users is filtered, including monitoring workstations and servers accessed by users to obtain the user login data for the users. User login records are created for a current time period based, at least in part, on the user login data. An anomaly score is determined for each user, where the anomaly score indicates a deviation by the user from historical login patterns of the user. A user machine learning (ML) model is updated based on the predicting. User period login records are maintained over time using processed user login data. The user ML model is trained using the user periodic login records. Enriched login statistics are generated using the user ML model and the user periodic login records. A report that includes the enriched login statistics is generated in a graphical user interface.

The foregoing and other described implementations can each, optionally, include one or more of the following features:

A first feature, combinable with any of the following features, where filtering the user login data for the users includes collecting and filtering an event log documenting successful login events for users.

A second feature, combinable with any of the previous or following features, where creating user login records for a current time period includes: determining that a configurable period of time has passed; and grouping the user login data for the configurable period of time, including determining, for each of the users, a number of logins performed, a number of systems accessed, a number of source systems used to access a system, a list of unique access-to systems with a login frequency for each access-to system, a list of unique access-from systems with a login frequency for each access-from system, and a count of each authentication protocol used.

A third feature, combinable with any of the previous or following features, where determining the anomaly score for each user includes: extracting numerical features from each user's current period login records for the current time period; evaluating the numerical features using user ML model; and predicting, using the evaluating, the anomaly score for the user.

A fourth feature, combinable with any of the previous or following features, where maintaining the user period login records over time includes: updating historical login records using login data for current time period; and maintaining the historical login records within a threshold list size.

A fifth feature, combinable with any of the previous or following features, where training the user ML model using the user periodic login records includes summarizing user records collected from previous time periods used as training samples.

A sixth feature, combinable with any of the previous or following features, where generating the enriched login statistics includes: generating an average number of logins the user performs per day using information in user historical login records; generating an average number of systems accessed per day; identifying a first date each system has been accessed; and identifying a number of periods during which the accessed systems have been accessed.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. User login data for users is filtered, including monitoring workstations and servers accessed by users to obtain the user login data for the users. User login records are created for a current time period based, at least in part, on the user login data. An anomaly score is determined for each user, where the anomaly score indicates a deviation by the user from historical login patterns of the user. A user machine learning (ML) model is updated based on the predicting. User period login records are maintained over time using processed user login data. The user ML model is trained using the user periodic login records. Enriched login statistics are generated using the user ML model and the user periodic login records. A report that includes the enriched login statistics is generated in a graphical user interface.

The foregoing and other described implementations can each, optionally, include one or more of the following features:

A first feature, combinable with any of the following features, where filtering the user login data for the users includes collecting and filtering an event log documenting successful login events for users.

A second feature, combinable with any of the previous or following features, where creating user login records for a current time period includes: determining that a configurable period of time has passed; and grouping the user login data for the configurable period of time, including determining, for each of the users, a number of logins performed, a number of systems accessed, a number of source systems used to access a system, a list of unique access-to systems with a login frequency for each access-to system, a list of unique access-from systems with a login frequency for each access-from system, and a count of each authentication protocol used.

A third feature, combinable with any of the previous or following features, where determining the anomaly score for each user includes: extracting numerical features from each user's current period login records for the current time period; evaluating the numerical features using user ML model; and predicting, using the evaluating, the anomaly score for the user.

A fourth feature, combinable with any of the previous or following features, where maintaining the user period login records over time includes: updating historical login records using login data for current time period; and maintaining the historical login records within a threshold list size.

A fifth feature, combinable with any of the previous or following features, where training the user ML model using the user periodic login records includes summarizing user records collected from previous time periods used as training samples.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    filtering, for users, user login data, including monitoring workstations and servers accessed by users to obtain the user login data;
    creating user login records for a current time period based, at least in part, on the user login data;
    determining, as a determined anomaly score, an anomaly score for each user, wherein the anomaly score indicates a deviation by the user from historical login patterns of the user;
    updating, based on the determined anomaly score, a user machine learning (ML) model;
    maintaining, over time using the user login data, user period login records;
    training the user ML model using the user periodic login records;
    generating, using the user ML model and the user periodic login records, enriched login statistics;
    generating, in a graphical user interface, a report that includes the enriched login statistics; and
    disabling, using the enriched login statistics and a rule set defining automatic actions to be performed in response to certain login conditions, a user account of the user when the anomaly score for the user exceeds a threshold and when the user does not have one or more of an associated valid change request and a recent role change.

2. The computer-implemented method of claim 1, wherein filtering the user login data includes collecting and filtering an event log documenting successful login events for users.

3. The computer-implemented method of claim 1, wherein creating user login records for a current time period includes:
    determining that a configurable period of time has passed; and
    grouping the user login data for the configurable period of time, including determining, for each of the users, a number of logins performed, a number of systems accessed, a number of source systems used to access a system, a list of unique access-to systems with a login frequency for each access-to system, a list of unique access-from systems with a login frequency for each access-from system, and a count of each authentication protocol used.

4. The computer-implemented method of claim 1, wherein determining the anomaly score for each user includes:
    extracting numerical features from each user's current period login records for the current time period;
    evaluating the numerical features using the user ML model; and
    predicting, using the evaluating, the anomaly score for the user.

5. The computer-implemented method of claim 1, wherein maintaining the user period login records over time includes:
    updating, using login data for the current time period, historical login records; and
    maintaining the historical login records within a threshold list size.

6. The computer-implemented method of claim 1, wherein training the user ML model using the user periodic login records includes summarizing user records collected from previous time periods used as training samples.

7. The computer-implemented method of claim 1, wherein generating the enriched login statistics includes:
    generating, using information in user historical login records, an average number of logins performed per day by each user;
    generating an average number of systems accessed per day by the user;
    identifying a first date each system has been accessed; and
    identifying a number of periods during which accessed systems have been accessed.

8. A non-transitory, computer-readable medium storing one or more instructions executable by a computer system to perform operations comprising:
    filtering, for users, user login data, including monitoring workstations and servers accessed by users to obtain the user login data;
    creating user login records for a current time period based, at least in part, on the user login data;
    determining, as a determined anomaly score, an anomaly score for each user, wherein the anomaly score indicates a deviation by the user from historical login patterns of the user;
    updating, based on the determined anomaly score, a user machine learning (ML) model;
    maintaining, over time using the user login data, user period login records;
    training the user ML model using the user periodic login records;
    generating, using the user ML model and the user periodic login records, enriched login statistics;
    generating, in a graphical user interface, a report that includes the enriched login statistics; and disabling, using the enriched login statistics and a rule set defining automatic actions to be performed in response to certain login conditions, a user account of the user when the anomaly score for the user exceeds a threshold and when the user does not have one or more of an associated valid change request and a recent role change.

9. The non-transitory, computer-readable medium of claim 8, wherein filtering the user login data includes collecting and filtering an event log documenting successful login events for users.

10. The non-transitory, computer-readable medium of claim 8, wherein creating user login records for a current time period includes:
determining that a configurable period of time has passed; and
grouping the user login data for the configurable period of time, including determining, for each of the users, a number of logins performed, a number of systems accessed, a number of source systems used to access a system, a list of unique access-to systems with a login frequency for each access-to system, a list of unique access-from systems with a login frequency for each access-from system, and a count of each authentication protocol used.

11. The non-transitory, computer-readable medium of claim 8, wherein determining the anomaly score for each user includes:
extracting numerical features from each user's current period login records for the current time period;
evaluating the numerical features using the user ML model; and
predicting, using the evaluating, the anomaly score for the user.

12. The non-transitory, computer-readable medium of claim 8, wherein maintaining the user period login records over time includes:
updating, using login data for the current time period, historical login records; and
maintaining the historical login records within a threshold list size.

13. The non-transitory, computer-readable medium of claim 8, wherein training the user ML model using the user periodic login records includes summarizing user records collected from previous time periods used as training samples.

14. The non-transitory, computer-readable medium of claim 8, wherein generating the enriched login statistics includes:
generating, using information in user historical login records, an average number of logins performed per day by each user;
generating an average number of systems accessed per day by the user;
identifying a first date each system has been accessed; and
identifying a number of periods during which accessed systems have been accessed.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
filtering, for users, user login data, including monitoring workstations and servers accessed by users to obtain the user login data;
creating user login records for a current time period based, at least in part, on the user login data;
determining, as a determined anomaly score, an anomaly score for each user, wherein the anomaly score indicates a deviation by the user from historical login patterns of the user;
updating, based on the determined anomaly score, a user machine learning (ML) model;
maintaining, over time using the user login data, user period login records;
training the user ML model using the user periodic login records;
generating using the user ML model and the user periodic login records, enriched login statistics;
generating, in a graphical user interface, a report that includes the enriched login statistics; and
disabling, using the enriched login statistics and a rule set defining automatic actions to be performed in response to certain login conditions, a user account of the user when the anomaly score for the user exceeds a threshold and when the user does not have one or more of an associated valid change request and a recent role change.

16. The computer-implemented system of claim 15, wherein filtering the user login data includes collecting and filtering an event log documenting successful login events for users.

17. The computer-implemented system of claim 15, wherein creating user login records for a current time period includes:
determining that a configurable period of time has passed; and
grouping the user login data for the configurable period of time, including determining, for each of the users, a number of logins performed, a number of systems accessed, a number of source systems used to access a system, a list of unique access-to systems with a login frequency for each access-to system, a list of unique access-from systems with a login frequency for each access-from system, and a count of each authentication protocol used.

18. The computer-implemented system of claim 15, wherein determining the anomaly score for each user includes:
extracting numerical features from each user's current period login records for the current time period;
evaluating the numerical features using the user ML model; and
predicting, using the evaluating, the anomaly score for the user.

19. The computer-implemented system of claim 15, wherein maintaining the user period login records over time includes:
updating, using login data for the current time period, historical login records; and
maintaining the historical login records within a threshold list size.

20. The computer-implemented system of claim 15, wherein training the user ML model using the user periodic login records includes summarizing user records collected from previous time periods used as training samples.

* * * * *